M. McKENZIE.
APPARATUS FOR EXTRACTING TURPENTINE AND OTHER SUBSTANCES FROM WOOD.
APPLICATION FILED JUNE 20, 1908.
Reissued Aug. 6, 1912. 13,456.
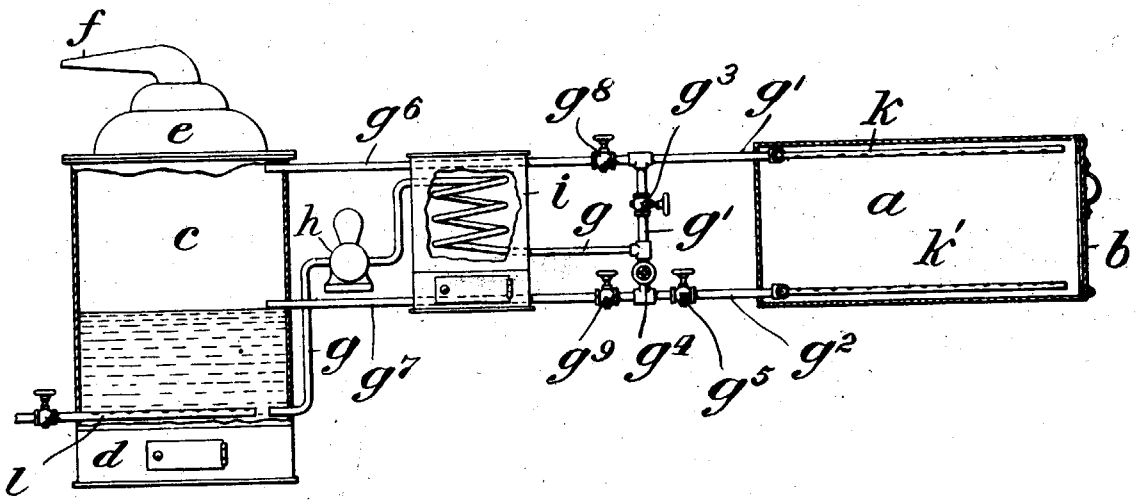
Attest:
Edgeworth Greene
A. L. Reilly
by
Inventor.
Malcolm McKenzie
Redding Sculley & Dustin
Attys

UNITED STATES PATENT OFFICE.

MALCOLM McKENZIE, OF PLAINFIELD, NEW JERSEY.

APPARATUS FOR EXTRACTING TURPENTINE AND OTHER SUBSTANCES FROM WOOD.

13,456. Specification of Reissued Letters Patent. Reissued Aug. 6, 1912.

Original No. 852,236, dated April 30, 1907, Serial No. 293,920. Application for reissue filed June 20, 1908. Serial No. 439,631.

*To all whom it may concern:*

Be it known that I, MALCOLM McKENZIE, a citizen of the United States, and a resident of Plainfield, in the State of New Jersey, have invented certain new and useful Improvements in Apparatus for Extracting Turpentine and other Substances from Wood, of which the following is a specification, reference being had to the accompanying drawings, forming a part hereof.

This invention relates to the extraction of turpentine and other substances from wood by means of a bath of rosin or similar material, in which the wood is subjected to the action of rosin at a high temperature, the turpentine and volatile substances which are set free in the bath being conducted from the vessel in which the wood is treated and condensed.

It has been found that the separation of the volatile substances from the bath of rosin or other like material is greatly facilitated by the introduction of steam into the bath and it has been proposed to introduce steam for this purpose into the vessel in which the wood is treated. However, the extraction of turpentine and other more or less volatile substances from the wood is most efficiently carried on when the bath is maintained at a relatively high temperature, preferably at or about 380 degrees F. and the introduction of steam into the bath in which the wood is directly treated renders it practically impossible to maintain the desired temperature.

It is therefore the object of this invention to improve the means for extracting the turpentine and other more or less volatile substances in such a way as to permit the desired temperature to be maintained in the bath while the wood is being acted upon, and at the same time to permit the separation of the turpentine and other substances from the bath to be facilitated by the use of steam, the operation of the method progressing meanwhile continuously and without interruption.

In accordance with the invention the rosin bath is circulated continuously, is heated as it approaches the point at which it acts upon the wood, and at a remote point, after it has become charged with the turpentine and other substances, is subjected to the action of steam which agitates and cools the same, the vapors disengaged being immediately conducted away and condensed.

The invention will be more fully described hereinafter with reference to the accompanying drawing, which represents, partly in elevation and partly in section, and in a more or less conventional manner, an apparatus which embodies the invention.

The wood to be treated is placed in a suitable closed vessel $a$, which may be completely filled, suitable spaces being left for the passage of the bath throughout the mass of wood. This vessel is provided with a suitable door, which when opened permits the vessel to be charged and which may be closed tightly. Otherwise, this vessel has no opening except for the admission and discharge of the bath it being obvious however that as many doors may be provided as desired for expeditiously inserting and removing the wood provided said doors may be tightly closed.

A second vessel $c$, independent of the vessel $a$, is adapted to receive the bath, being provided, if desirable, with a fire-box $d$ or other suitable means to assist in raising the temperature of the bath to the desired temperature before commencing the circulation of the bath, and with the usual dome $e$ and worm, partly indicated at $f$, of an ordinary still. Communication is established, through a pipe $g$, between the lower portion of the vessel $c$ and the vessel $a$, such pipe being provided with a pump $h$ to maintain the circulation of the bath, a heater $i$ by which the bath can be reheated and brought to the desired temperature as it passes from the vessel $c$ to the vessel $a$, and branches $g'$ and $g^2$ provided with cocks $g^3$, $g^4$ and $g^5$, and communicating, at the top and bottom respectively of the tank or vessel $a$, with perforated distributing pipes $k, k'$. The branches $g'$, $g^2$ are likewise connected with the vessel $c$ by extensions $g^6$ and $g^7$ respectively, such extensions being provided with cocks $g^8$ and $g^9$ respectively. The provision of the branches $g'$, $g^2$ of the pipe $g$, their extensions $g^6$ and $g^7$, and the several cocks referred to, is for the purpose, as will be readily understood, of permitting the direction of movement of the bath through the vessel $a$ to be reversed.

The vessel $c$ is provided, in its lower portion, with a perforated steam distributing pipe $l$, through which steam can be admitted to the bath as it lies in the vessel $c$ for the purpose of facilitating the separation of the turpentine and other substances.

In the operation of the apparatus shown in the drawing, the vessel $a$ is filled with wood, suitably divided to permit of the permeation of the bath throughout the mass and the vessel $c$ is partly filled with melted rosin, the temperature thereof being maintained by suitable means. By the pump $h$ the bath is transferred from the vessel $c$ to the vessel $a$, which it fills completely and from which it returns to the vessel $c$. If the cocks $g^3$, $g^5$ and $g^9$ are opened and the other cocks are closed, the heated rosin will enter the vessel $a$ through the pipe $k$ and will be returned to the vessel $c$ through the pipe $k'$ and the pipe $g^7$; while if the cocks $g^4$, $g^5$ and $g^8$ be opened and the other cocks closed the heated rosin will enter the tank $a$ through the pipe $k'$ and will be returned to the vessel $c$ through the pipe $k$ and the branch $g^6$. In its passage from the vessel $c$ to the vessel $a$ the bath is reheated by the heater $i$ to the temperature which is best suited for action upon the wood. As the melted rosin or other material, charged with the turpentine or other more or less volatile substances extracted from the wood, passes through the vessel $c$, in which it lies in suitable quantity, it is subjected to the action of the steam from the pipes $l$ which agitates and cools the bath and the separation of the turpentine and other volatile substances is facilitated, the vapors passing off through the dome and worm and being condensed in the usual manner. It will be observed, however, that the temperature of the bath in the vessel $a$ is not affected by the introduction of steam in the vessel $c$, the temperature of the bath, which is lowered in the vessel $c$ by the introduction of steam being restored in the passage of the bath to the vessel $a$ by the heater $i$.

It will be understood that the details of construction and arrangement of the apparatus can be varied from what is shown in the drawing without departing from the spirit of the invention.

I claim as my invention:

1. An apparatus for the extraction of turpentine, etc., from wood, comprising a closed vessel for the reception of the wood to be treated provided with inlets and outlets at the top and bottom for the bath and combined products, a vessel for the reception of the bath with which the wood is to be treated, means for circulating the bath between the two vessels, means for introducing steam into the bath in the second named vessel, means for condensing the vapors from the second named vessel, and means for reheating the bath on its return from the second named vessel to the first named vessel.

2. An apparatus for the extraction of turpentine, etc., from wood, comprising a vessel for the reception of the wood to be treated, provided with inlets and outlets at the top and bottom for the bath and combined products, a vessel for the reception of a portion of the bath with which the wood is to be treated, means for circulating a portion of the bath between the two vessels, means for introducing steam into the portion of the bath in the second named vessel to remove the extracted products, and means for condensing all the vapors from the second named vessel, substantially as described.

3. An apparatus for the extraction of turpentine, etc., from wood, comprising a closed vessel for the reception of the wood to be treated provided with inlet and outlet for the bath and combined products respectively, a vessel for the reception of the bath and combined products, means for circulating the bath between the two vessels, means for introducing steam into the bath in the second named vessel, means for condensing the vapors from the second named vessel, and means for reheating the bath on its return from the second named vessel to the first named vessel.

4. An apparatus for the extraction of turpentine, etc., from wood, comprising a vessel for the reception of the wood to be treated provided with inlet and outlet for the bath and combined products respectively, a vessel for the reception of a portion of the bath with which the wood has been treated, means for circulating a portion of the bath between the two vessels, means for introducing steam into the portion of the bath in the second named vessel to remove the extracted products, and means for condensing all the vapors from the second named vessel.

5. An apparatus for the extraction of turpentine, etc., from wood, comprising a closed vessel for the reception of the wood to be treated provided with inlet and outlet for the bath and combined products respectively, a vessel for the reception of the bath and combined products, means for circulating a portion of the bath between the two vessels, a pressure regulating device in said circuit, means for introducing steam into the portion of the bath in the second named vessel, means for condensing the vapors from the second named vessel and means for reheating the bath on its return from the second named vessel to the first named vessel.

6. An apparatus for the extraction of turpentine, etc., from wood comprising a closed vessel for the reception of the wood to be treated, provided with inlet and outlet for the bath and combined products respectively, a vessel for the reception of the bath and combined products, a pump connected with said vessel for circulating a portion of the bath between the same, pressure regulating means in said circuit, means for introducing steam into the portion of the bath in the second named vessel, means for condensing the vapors from the second named vessel and means for reheating the bath on its return from the second named vessel to the first named vessel.

7. An apparatus for the extraction of turpentine, etc., from wood, comprising a vessel for the reception of the wood to be treated provided with inlet and outlet for the bath and combined products respectively, a vessel for the reception of a portion of the bath with which the wood has been treated, means comprising a pump and a valve mechanism for circulating a portion of the bath between the two vessels, means for introducing steam into the portion of the bath in the second named vessel to remove the extracted products, and means for condensing the vapors from the second named vessel.

This specification signed and witnessed this 11th day of June, A. D., 1908.

MALCOLM McKENZIE.

Signed in the presence of—
A. L. Reilly,
E. M. Taylor.